(Model.)
J. McANESPEY.
Ice Cream Beater.
No. 229,726.
Patented July 6, 1880.
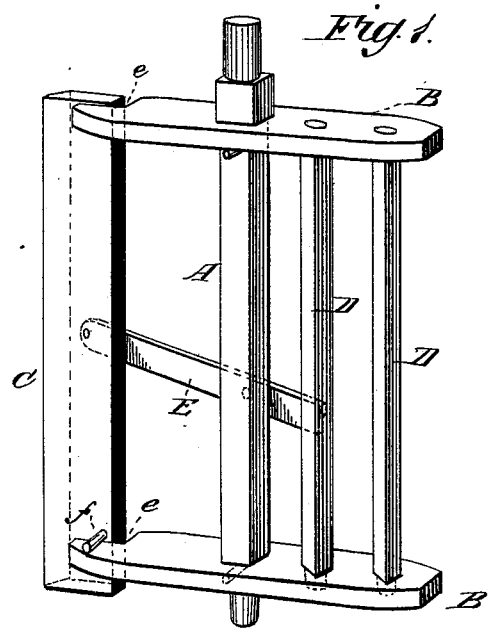
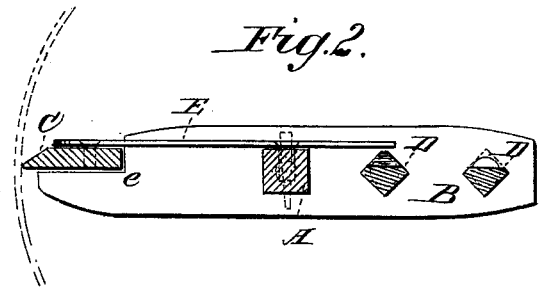
WITNESSES:
INVENTOR:
ATTORNEYS.

UNITED STATES PATENT OFFICE.

JOHN McANESPEY, OF PHILADELPHIA, PENNSYLVANIA.

ICE-CREAM BEATER.

SPECIFICATION forming part of Letters Patent No. 229,726, dated July 6, 1880.

Application filed March 2, 1880. (Model.)

*To all whom it may concern:*

Be it known that I, JOHN McANESPEY, of Philadelphia, in the county of Philadelphia and State of Pennsylvania, have invented a new and useful Improvement in Ice-Cream Beaters, of which the following is a specification.

My invention relates to rotary beaters; and it consists in a novel construction and combination of a vertical barred beater and an automatic scraper for removing the ice-cream from the interior surface of the can.

In the accompanying drawings, Figure 1 represents a perspective view of my improved beater. Fig. 2 is a transverse horizontal section of the same.

Similar letters of reference indicate corresponding parts.

A represents a vertical shaft with two horizontal radial arms, B B, attached thereto—one near the upper and the other near the lower end of said shaft, which passes through said arms about midway of their length.

On one side of the shaft A the arms B B carry two vertical bars, D D, having their ends inserted in said arms. These bars are triangular in form, so that in one direction they present a flat surface and in the other direction a wedge-shaped or cutting edge. On the opposite side of the shaft A is an automatic scraper consisting of a flat bar, C, connected to the shaft A by a bar, E, arranged diagonally and attached to the bar C and shaft A by pivots, so as to allow the former to rise and fall freely.

The ends of the scraper C work in recesses *e e* in the ends of the bars B B, and its downward motion is limited by a stop consisting of a pin, *f*, abutting against the bar B.

This beater may be used with either a continuous or a reciprocating rotary motion. The scraper removes the cream which is thrown against the surface of the can by centrifugal force, and the peculiar manner in which it is arranged enables it to accommodate itself to any obstructions or irregularities which may exist in the interior of the can, or to follow the surface thereof if the shaft A should happen to be not exactly concentric with the can.

I am aware that it is not new to provide a dasher with a scraper and two-edged beater, or to use a scraper pivoted to the central arm of dasher-shaft, or to use a scraper pivoted to the shaft and adapted to be pressed to the interior of the cream by means of leverage from the handle; but What I do claim as new and of my invention is—

In an ice-cream beater, the combination, with a rotary shaft having arms B, with the end notches, *e*, of the scraper C, working in said notches, having pins *f* at the lower end, and connected with shaft by a bar, E, said bar being pivoted to the scraper and shaft, as shown and described.

JOHN McANESPEY.

Witnesses:
W. H. LAMB, Jr.,
W. H. LAMB, Sr.